Patented Jan. 17, 1939

2,143,951

UNITED STATES PATENT OFFICE 2,143,951

METHOD AND APPARATUS FOR THE MANUFACTURE OF CELLULAR GLASS

Roger Lambert, Levallois-Perret, France, assignor to Societe Anonyme des Manufactures des Glaces & Produits Chimiques de Saint-Gobain, Chauny & Cirey, Paris, France Application January 24, 1935, Serial No. 3,209
In France January 27, 1934

14 Claims. (Cl. 49—14)

It is known that when the temperature of a fused and refined glass is lowered and then raised again to about 1400° C., the glass swells and is filled with bubbles. The ebullition even takes place towards 1200° C. when glass is fused in a hermetically sealed chamber and the pressure is lowered in this chamber. This phenomenon, which is due to the presence of gas dissolved in the glass, can, in certain cases, be intensified by the addition of substances capable of producing gas bubbles within the glass.

The present invention utilizes these known facts, and has for its subject a process for the manufacture of multi-cellular glass (that is to say, a glass containing a great quantity of bubbles isolated from one another) in which the formation and the development of gas bubbles may be regulated in such manner as to give to the product obtained a reduced apparent density determined in advance, as well as thermal and acoustic insulating qualities.

The process according to the invention is characterized by the step of subjecting fused and bubbly glass to a depression created in the interior of a mould whereby the glass is caused to dilate and take the form of the mould prior to solidifying.

In one mode of carrying out the process, a weight of glass determined as hereinafter stated is heated to a temperature of about 1400° C., the fused and bubbly glass thus obtained is transferred into a mould heated to about 400° C., the pressure in the mould is lowered to a degree such that the glass in expanding fills the mould, the degree of vacuum thus established is maintained until the glass solidifies, the mould is rapidly opened, and the moulded glass is placed in a chamber at about 600° C. where it is allowed to cool slowly.

If the apparent density of the multi-cellular glass that is to be obtained is represented by $d$ (which can have a value as low as 0.3 as shown by experiment) and if $v$ is the volume of the mould whose form and dimensions correspond to those of the object to be manufactured, the weight of glass to be treated is equal to $v \times d$.

The heating, which constitutes the first part of the operation, can be effected in a crucible wherein a determined quantity of fused glass has been placed, drawn from a furnace with the aid of ladles or suction means, a supplied by feeders. It is also possible to fuse directly in a crucible pieces of glass or cullet whose weight has been calculated as above. The latter operative mode causes a very notable expansion of the glass, which can be still further augmented if desired, by the addition of substances such as barium sulphate. The size of the bubbles is increased and their number diminished with the duration of the heating.

The glass or the cullet chosen will be of suitable composition and colouration to permit the obtaining of a cellular glass having the desired translucency and tint.

The lowering of the pressure in the mould is preferably effected by closing the mould with the aid of a loose cover which permits the pressure to become balanced between the interior and the exterior of the mould, and by placing the latter in a chamber communicating with vacuum apparatus.

The apparent density of the final product is uniform if the vacuum is produced without delay in this chamber. The density decreases from the bottom and the edges of the mould up to the neighbourhood of the cover if, on the contrary, the lowering of the pressure is retarded, that is to say, if the bubbly glass is allowed to cool in contact with the bottom and the walls of the mould before the vacuum is applied; it is thus possible to obtain blocks of cellular glass having surfaces different in kind and appearance.

In a variation of the process, the re-agitation of the glass is eliminated by drawing the fused glass from a part of the furnace where it is still bubbly, that is to say, before it is refined. The unrefined glass contains in fact a quantity of small bubbles whose number can be augmented and whose dimensions can be developed when the pressure exerted on its surface is reduced.

Moreover, instead of pouring the bubbly glass into a mould, as indicated above, it is also advisable to pour it on to a horizontal surface or into a shallow receptacle with a flat bottom, and to press a mould, open at its lower part, into the layer of glass thus formed.

The mould is preferably divided into compartments which each contains a predetermined volume of glass.

The mould and its compartments being rendered fluid tight by the glass itself, a depression is created therein which permits the glass to expand and fill each compartment. As soon as the glass has set it is freed from the mould by admitting air under pressure through the vacuum conduits. It is sufficient thereafter to break the joints of glass of very small thickness which connect the different moulded blocks together and to the excess of glass which lies about the mould.

It has been indicated above that if the bubbly glass is left for a certain time in contact with the walls of the mould before the pressure is lowered in the interior of the latter, the multi-cellular glass objects thus moulded have surfaces different in kind and appearance, from the fact that the glass which is cooled in contact with the walls of the mould is more dense than that which dilates under the influence of the depression.

The surfaces of the moulded object corresponding to the parts of the glass which have not been in contact with the walls of the mould prior to the aspiration can also be modified either by cooling the free surface of the glass in the mould, for example, by means of an air current or by contact with a cold body, in each manner as to create a superficial layer of more viscous glass, or by covering the free surface of the glass with a layer of less bubbly glass; the more viscous or less bubbly layer expands during the aspiration period while enveloping the swelling mass of bubbly glass.

The same result can be obtained if the interior of the mould is lined with a thin layer of glass before introducing the bubbly glass intended to be expanded.

The invention is illustrated, by way of example only, in the attached drawings in which:—

Fig. 2 shows the mould before lowering into a mass of bubbly glass poured into a receptacle.

Fig. 3 shows the mould after lowering into the mass of glass and at the end of the period of the depression created in the mould.

Fig. 4 shows the mould in the course of removal.

Figure 1:
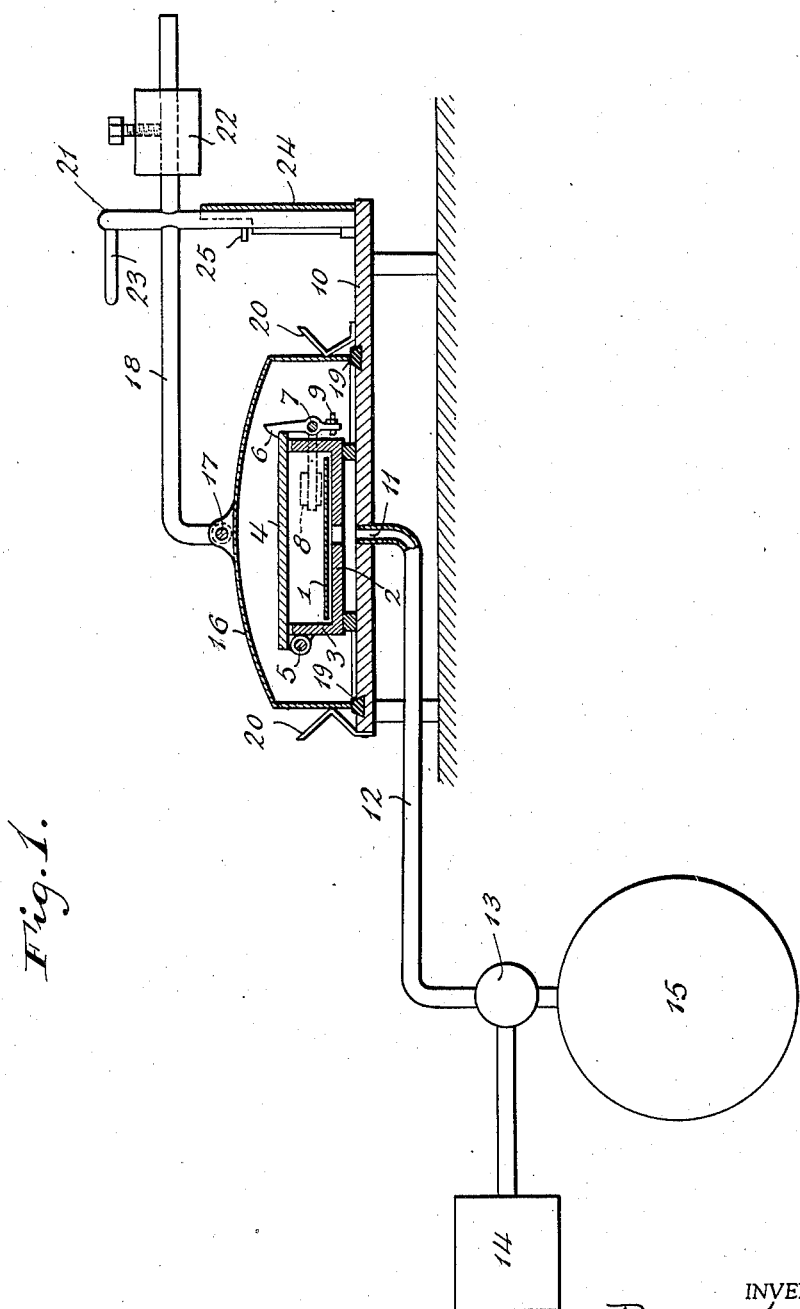
Fig. 1 is a vertical section of an apparatus for carrying out the process.

In the apparatus shown in Fig. 1, the mould comprises a double bottom 1 and 2, walls 3 and a loose cover 4 turnable about a hinge 5. This cover is maintained in its closed position by a finger 6 which is turnable about a pin 7 fixed to the wall of the mould and is provided with a counter-weight 8 and a stop 9.

The mould is mounted on a platform 10 pierced with an orifice 11 in which is fitted the end of a tube 12 which communicates by way of a three-way cock with a vacuum pump 14 and a vacuum reservoir 15.

A bell 16, articulated at 17 to a bar 18 is adapted to rest by its base on a sealing ring 19 fixed to the platform 10. Guides 20 also fixed to the platform permit the centering of the bell on the ring 19.

The bar 18 is carried by a rod 21, on which it is balanced by an adjustable counter-weight 22. This rod can be raised or lowered by means of a handle 23 being slidable in a socket 24, within which it can also turn. A spur 25 fixed to the rod 21 permits the latter to be arrested in the two extreme positions of its double movement of translation and rotation in the socket 24.

The functioning of the apparatus is as follows:

When the heated and open mould has been placed on the platform 10 in the centre of the ring 19, the fused and bubbly glass obtained as above described is poured therein and the cover 4 is closed by turning about the hinge 5. The finger 6 maintains the cover in the closed position. The bell 16, which was during this time suspended in a removed position, owing to the rod 21 being lifted and turned in the socket 24, is brought back by a reverse rotation of the rod above the mould and lowered on to the ring 19.

When the bell has been lowered, the three-way cock 13, which has permitted the pump 14 to create a vacuum in the reservoir 15, is turned so as to cause the chamber comprised between the bell 16 and the platform 10 on which it rests and, consequently, the interior of the mould, to be put in communication with the reservoir 15, then with the pump 14, so as to lower first rapidly and then in a continuous manner the pressure on the glass contained in the mould.

After a lapse of time judged to be necessary from experiment for the solidification of the glass, air is allowed to re-enter, the bell 16 is displaced by lifting and turning the rod 21 about itself, the mould and its contents are carried near to a reheating furnace and, after the mould has been opened, a heated plate is placed on the glass moulded object to receive this object when it is disengaged from the mould after reversal of the latter, and the plate is placed with the object which it carries in the reheating furnace.

Figure 2:
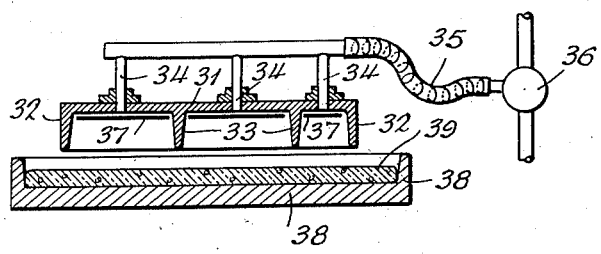
Figs. 2 to 4 show a mould with three compartments and the manner of its utilization for the simultaneous manufacture of three blocks of multi-cellular glass.
Figure 3:
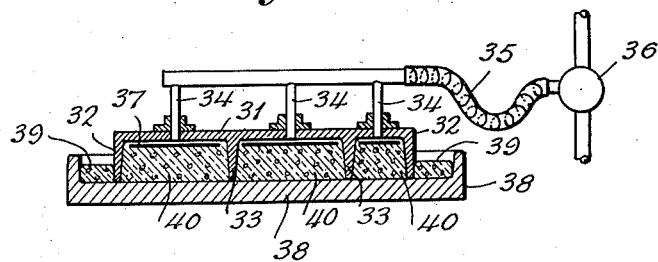
Figure 4:
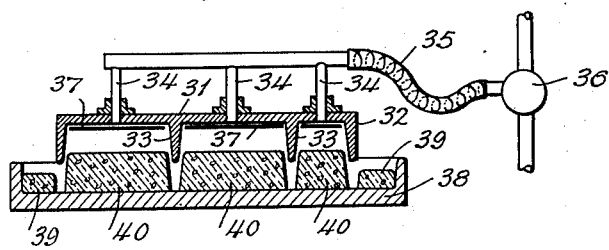

In the variation according to Figs. 2 to 4, the mould comprises a buttom 31 and walls 32. It is divided into three compartments by partitions 33. Into each compartment there opens a branch 34 from a flexible conduit 35, which can be put into communication, by a three-way cock 36, either with a reservoir within which there exists a vacuum, or with a compressed air reservoir, these reservoirs not being shown.

Baffle plates 37 prevent the bubbly glass, which in dilating fills each compartment, from penetrating into the branches 34.

A shallow receptacle 38 is intended to receive a mass of bubbly glass 39 which spreads itself therein as shown in Fig. 2.

The mould is pressed down into this mass of bubbly glass, as shown in Fig. 3, and when the lower edges of the walls 32 and the partitions 33 touch the bottom of the receptacle 38, the cock 36 is operated so as to put the three compartments of the mould in communication with the vacuum reservoir. The mass of glass which surrounds the walls of the mould forms a sealing joint about the latter and the bubbly glass expands, filling the compartments of the mould with multi-cellular glass 40.

For removing the three blocks of cellular glass thus formed from the mould after their solidification, the three-way cock 36 is actuated so as to direct compressed air into the compartments filled by these blocks and thus disengage the lifted mould while the three blocks of multi-cellular glass are drawn out and separated from the residue of the bubbly glass which remains in the receptacle 38.

What is claimed is:

1. A method for the manufacture of multi-cellular glass having a predetermined density comprising fusing a determined quantity of pieces of glass or cullet with barium sulphate added to the glass prior to fusion, transferring the fused bubbly glass thus obtained in a heated mould, decreasing the pressure in the mould to a degree such that the glass by swelling fills entirely the mould, maintaining the degree of vacuum thus established until the glass is solidified, rapidly opening the mould and placing the moulded glass in a chamber at about 600° C. where it is allowed to cool slowly.

2. Apparatus for the manufacture of multi-cellular glass comprising a shallow receptacle or other surface adapted to support a layer of bubbly glass, in combination with a mould vertically movable to be pressed into and lifted from such layer, and means enabling the lowering of the pressure in the chamber between the said receptacle or surface and the said mould when lowered thereon.

3. An apparatus for the manufacture of multi-cellular glass, comprising means for supporting a fused glass mass containing gas bubbles, a mould having partition walls separating the interior thereof into a plurality of compartments, means for moving said mould relatively to said glass mass to press said mould into said glass mass and to remove the mould from said glass mass, and means connected with said mould for lowering the pressure in the compartments of said mould while said mould is pressed into said glass mass.

4. A method of manufacturing a block of multicellular glass, comprising the steps of heating a predetermined quantity of glass to a temperature which is higher than the highest temperature to which this glass has been subjected in the course of its formation, whereby a fused glass mass containing gas bubbles is formed, spreading said glass mass to form a layer, isolating from said layer a predetermined mass of bubble-containing glass with a predetermined space above it, lowering the pressure in said space, whereby the last-mentioned bubbles-containing glass mass swells and fills a predetermined volume, solidifying the last-mentioned glass mass to form a glass block, while the lowered pressure is being maintained and then placing the glass block in an atmosphere of about 600° C. and allowing it to cool slowly.

5. The method of manufacturing a block of multicellular glass which comprises providing a predetermined quantity of molten unrefined glass which contains gas bubbles, said molten unrefined glass being removed from a glass-melting furnace, spreading said glass to form a layer, isolating from said layer a predetermined mass of bubble-containing glass with a predetermined space above it, lowering the pressure in said space until a predetermined degree of vacuum is established which causes said bubbles-containing mass to swell and fill a predetermined volume, solidifying said glass mass to form a glass block while maintaining said degree of vacuum, then placing said glass block in an atmosphere of about 600° C. and causing it to cool slowly.

6. A method of manufacturing a multicellular glass block having a portion which is of greater density than another portion of said block, said method comprising coating at least one of the inner walls of a mold with a thin layer of molten glass, introducing a predetermined quantity of fused glass-containing bubbles into said mold, said fused glass containing a larger amount of bubbles than the first-mentioned layer of molten glass, then decreasing the pressure in said mold to a predetermined degree of vacuum to cause said fused glass to swell and fill said mold entirely, and causing the glass in said mold to solidify while maintaining said degree of vacuum.

7. A method of manufacturing a multicellular glass block having a portion of greater density than another portion of said glass block, said method comprising providing a fused glass mass containing bubbles, covering a surface of said glass mass with a layer of molten glass which contains less bubbles than said fused glass mass, decreasing the pressure above said glass mass to a predetermined degree of vacuum to cause the glass to swell and fill a predetermined volume, and causing the glass to solidify while maintaining said degree of vacuum.

8. The method of manufacturing a plurality of blocks of multicellular glass, which comprises providing a fused glass mass containing gas bubbles, spreading said glass mass to form a layer, isolating from said layer a plurality of predetermined masses of said bubble-containing glass with a predetermined space above each of them, then lowering the pressure in each of said spaces to cause the last-mentioned glass masses to swell and fill a predetermined volume, solidifying the last-mentioned glass masses to form separate glass blocks while maintaining the lowered pressure, and then placing the glass blocks in an atmosphere of about 500° C. and causing them to cool slowly.

9. The method of manufacturing a plurality of blocks of multicellular glass, which comprises providing a fused glass mass containing gas bubbles, spreading said glass mass to form a layer, isolating from said layer a plurality of predetermined masses of said bubble-containing glass with a predetermined space above it, then simultaneously lowering the pressure upon all of the isolated last-mentioned glass masses to cause the last-mentioned glass masses to swell and fill predetermined volumes, solidifying simultaneously the last-mentioned glass masses to form separate glass blocks while maintaining the lowered pressure, and then simultaneously placing the glass blocks in an atmosphere of about 600° C. and causing them to cool slowly.

10. A method of manufacturing a multicellular glass block having at least one portion of greater density than another portion of said glass block, said method comprising providing a fused glass mass containing gas bubbles, applying a fluid which is cooler than said fused glass mass to a surface of said glass mass to cool the same, decreasing the pressure upon said glass mass until said glass mass swells and fills a predetermined volume, and causing said glass mass to solidify while maintaining the decreased pressure.

11. A method of manufacturing a multicellular glass block having at least one portion of greater density than another portion of said glass block, said method comprising covering at least one of the inner walls of a mold with a thin layer of molten glass, introducing into said mold a predetermined quantity of fused glass-containing bubbles, said layer of molten glass being cooler than said quantity of fused glass, decreasing the pressure in said mold to a predetermined degree to cause the glass in said mold to swell and fill the mold entirely, and causing the glass in said mold to solidify while maintaining the lowered pressure.

12. A method of manufacturing a multicellular glass block having at least one portion which is of greater density than another portion of said glass block, said portion comprising providing a fused glass mass containing bubbles, covering a surface of said fused glass mass with a layer of molten glass, said layer of molten glass being cooler than said fused glass mass, decreasing the pressure upon said glass mass and said layer to a predetermined degree of vacuum to cause the glass to swell and fill a predetermined volume, and causing the glass to solidify while maintaining said degree of vacuum.

13. The method of manufacturing a block of multicellular glass, which comprises providing a fused glass mass containing gas bubbles, spreading said glass mass to form a layer, isolating from said layer a predetermined mass of bubble-containing glass with a predetermined space above it, lowering the pressure in said space to a predetermined degree of vacuum to cause the last-mentioned mass to swell and fill a predetermined volume, solidifying the last-mentioned glass mass to form a glass block while maintaining said degree of vacuum, and then placing said glass block in an atmosphere of about 600° C. and causing it to cool slowly.

14. The method of manufacturing a block of multicellular glass, which comprises providing a fused glass mass containing gas bubbles, spreading said glass mass to form a layer, isolating from said layer a predetermined mass of bubble-containing glass with a predetermined space above it, lowering the pressure in said space to a predetermined degree of vacuum to cause the last-mentioned mass to swell and fill a predetermined volume, and solidifying the last-mentioned glass mass to form a glass block, while maintaining said degree of vacuum.

ROGER LAMBERT.